US006501734B1

(12) United States Patent
Yu et al.

(10) Patent No.: US 6,501,734 B1
(45) Date of Patent: Dec. 31, 2002

(54) APPARATUS AND METHOD IN A NETWORK SWITCH FOR DYNAMICALLY ASSIGNING MEMORY INTERFACE SLOTS BETWEEN GIGABIT PORT AND EXPANSION PORT

(75) Inventors: Ching Yu, Santa Clara, CA (US); Xiaohua Zhuang, Santa Clara, CA (US); Bahadir Erimli, Campbell, CA (US); John M. Chiang, San Jose, CA (US); Shashank Merchant, Sunnyvale, CA (US); Robert Williams, Cupertino, CA (US); Edward Yang, San Jose, CA (US); Chandan Egbert, San Jose, CA (US); Vallath Nandakumar, Campbell, CA (US), Ian; Ian Lam, Daly City, CA (US); Eric Tsin-Ho Leung, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/317,150

(22) Filed: May 24, 1999

(51) Int. Cl.[7] .............................. H04J 1/16; H04J 3/14
(52) U.S. Cl. ....................... 370/236; 370/230; 370/235; 370/237
(58) Field of Search ................................. 370/232, 235, 370/237, 347, 348, 376, 381, 382, 383, 442, 462, 468; 710/310, 311; 709/213; 711/147, 150, 151

(56) References Cited

U.S. PATENT DOCUMENTS

| 4,181,933 A | * | 1/1980 | Benysek ..................... 345/534 |
| 5,515,376 A | | 5/1996 | Murthy et al. |
| 6,052,738 A | * | 4/2000 | Muller et al. ............... 709/213 |
| 6,052,751 A | * | 4/2000 | Runaldue et al. ........... 710/100 |

* cited by examiner

Primary Examiner—Wellington Chin
Assistant Examiner—William Schultz

(57) ABSTRACT

A network switch having switch ports for full-duplex communication of data packets with respective network nodes according to Ethernet (IEEE 802.3) protocol dynamically allocates external memory bandwidth slots between high data rate ports. An external memory interface determines if a high data rate port makes a request for a bandwidth slot and grants the request if made. The slot is taken from a selected group which is a subset of the total number of slots. If a request for the slot is not made, the external memory interface assigns the slot to another high data rate port. Lower data rate ports in the network switch are assigned fixed slots from those slots not from within the selected group of slots. The dynamic allocation of bandwidth slots between the high data rate port enables the efficient use of limited memory bandwidth resources.

23 Claims, 9 Drawing Sheets

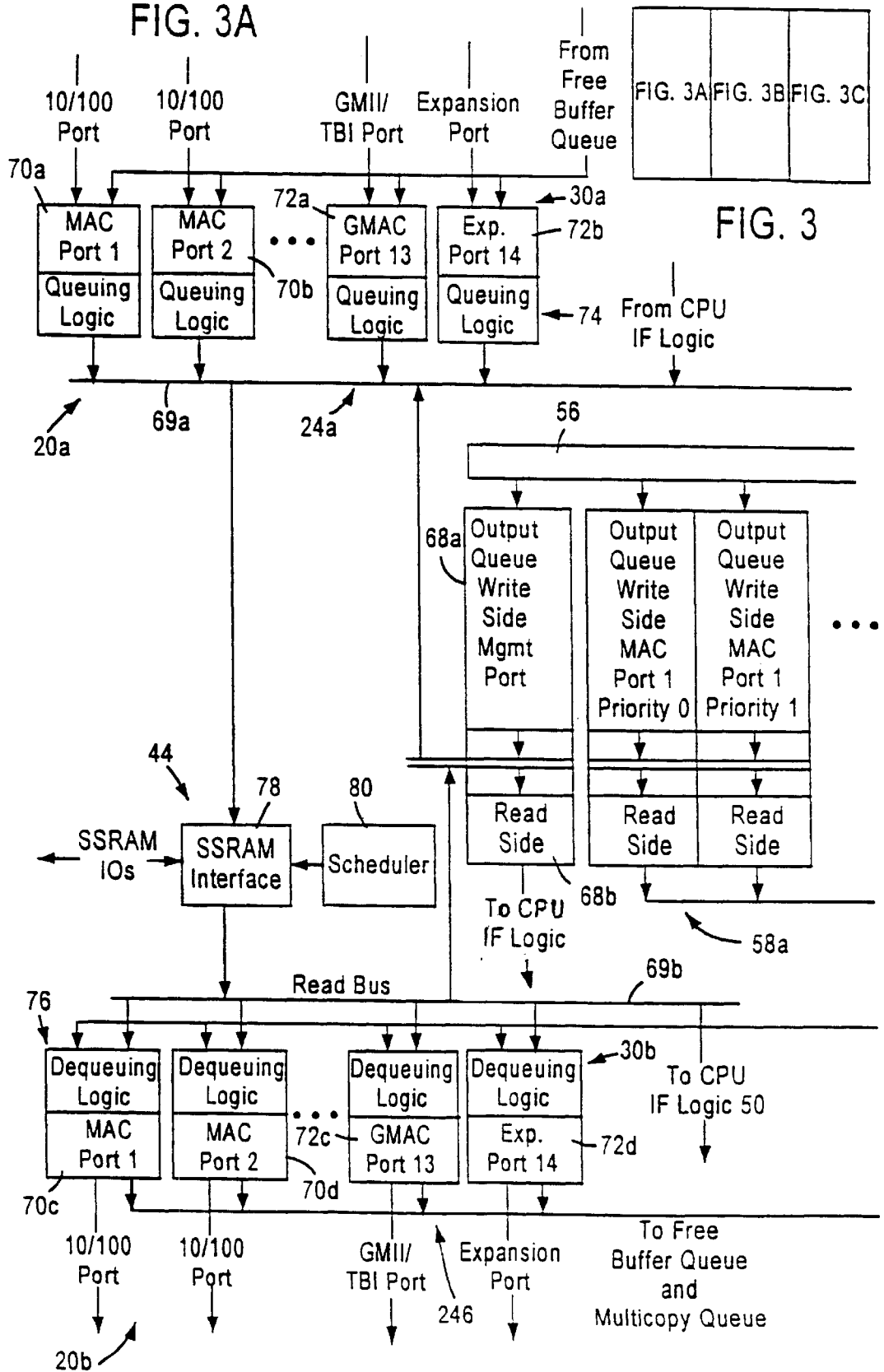

APPARATUS AND METHOD IN A NETWORK SWITCH FOR DYNAMICALLY ASSIGNING MEMORY INTERFACE SLOTS BETWEEN GIGABIT PORT AND EXPANSION PORT

TECHNICAL FIELD

The present invention relates to networks and more particularly, to a system and method of controlling network traffic data in a full-duplex switched network operating according to Ethernet (IEEE 802.3) protocol.

BACKGROUND ART

Switched local area networks use a network switch for supplying data frames between network stations or other network nodes, where each network node is connected to the network switch by a media. The switched local area network architecture uses a media access control (MAC) enabling a network interface within each network node and the network switch to access the media. The network switch stores and forwards data frames received from a transmitter node to a destination node based on header information and the data in the received frames, including source and destination address. An external memory, such as an SSRAM, is used by the network switch to temporarily store the data frames as they are passed through the switch. In particular, the network switch stores and fetches data frames in the external memory via an external memory bus.

A difficulty in designing a network switch to be "non-blocking" (i.e., preventing delay in transferring a data packet received at an input switch port) yet with limited memory bandwidth resources, is to ensure that each port of the network switch has sufficient memory resources allocated from the external memory to prevent the delay of data transmission. The external memory bus of an SSRAM, for example, has a limited bandwidth based on the number of data bits on the external memory bus (e.g., 16-bit, 32-bit, etc.) and the data rate of the bus. Hence, a network switch may allocate a fixed number of time slots for each port of the network switch. However, the data traffic on higher speed switch ports may exceed the bandwidth capacity of the external memory bus.

Previous switches have been proposed which assign memory slots to ports using a request based arbitration scheme that grants memory slots to those ports requesting slots on a "first come, first serve" basis. As the slots are requested, an arbitrator grants slots in answer to the requests as they are received, but only after previously requested slots have been completed. The flexible arbitration scheme, however, is complex and difficult to implement, increasing the likelihood for errors. From an implementation standpoint, such arbitration schemes present more difficulty in controlling the memory allocation.

Other systems have included fixed slot schemes which assign a fixed amount of bandwidth to each slot of the network switch. However, these systems are expensive since sufficient bandwidth capacity must be provided to all of the slots all of the time. Also, since ports are not always fully utilized at all times, much of the assigned bandwidth is wasted due to times of inactivity on a network switch port.

DISCLOSURE OF THE INVENTION

There is a need to efficiently allocate limited memory bandwidth resources by dynamically assigning memory slots between ports of a network switch to avoid wasting of bandwidth resources and more costly systems.

There is also a need to minimize the use of complex arbitration schemes by controlling memory allocation using arrangements that are easier to implement.

These and other needs are attained by the present invention, where lower bandwidth ports are assigned fixed bandwidth slots and higher bandwidth ports are dynamically allocated reserved bandwidth slots based on a detected presence of slot requests received from one of the higher bandwidth ports.

According to one aspect of the invention, a network switch includes one or more first ports configured for transferring packet data at a first data rate, at least one second port configured for transferring packet data at a second data rate higher than the first data rate and at least one third port configured for transferring packet data at a third data rate higher than the first data rate. The network switch also includes an external memory interface configured for transferring packet data between the switch and an external memory according to a prescribed bandwidth. The external memory interface includes a scheduler that assigns slots for data transfer according to the prescribed bandwidth. The scheduler assigns a first group of slots as fixed slots for the first ports, respectively. In addition, the scheduler dynamically assigns a second selected group of slots between the second port and the third port based on a detected presence of a slot request received from one of the second or third ports.

According to another aspect of the invention, a method in a network switch assigns bandwidth slots between ports of a network switch configured for transferring packet data to an external memory at a prescribed bandwidth. The method includes first assigning a predetermined number of bandwidth slots to a respective number of network switch ports and reserving a remaining number of the bandwidth slots for higher rate switch ports. Next, the method determines whether one higher rate port has generated a bandwidth request to an external memory interface for one of the reserved remaining bandwidth slots within a prescribed period of time. If a bandwidth request is generated, the reserved bandwidth slot is assigned to the requesting higher rate port in response to detection of the bandwidth request to the external memory interface within the prescribed period of time. If an absence of the bandwidth request is determined within the prescribed period of time, the one reserved bandwidth slot is assigned to a second higher rate port. The first assigning of the predetermined number of slots eliminates the need for a request based arbitration scheme and reduces the amount of logic needed to determine allocation of the remaining slots to the higher rate switch ports. The selective assignment of slots between two higher rate data ports based on whether or not a slot request is issued eliminates the necessity for complex logic, such as a flexible arbitration scheme, to determine the slot allocation. Hence, implementation is less costly while efficiently utilizing limited memory bandwidth resources.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DESCRIPTION OF THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
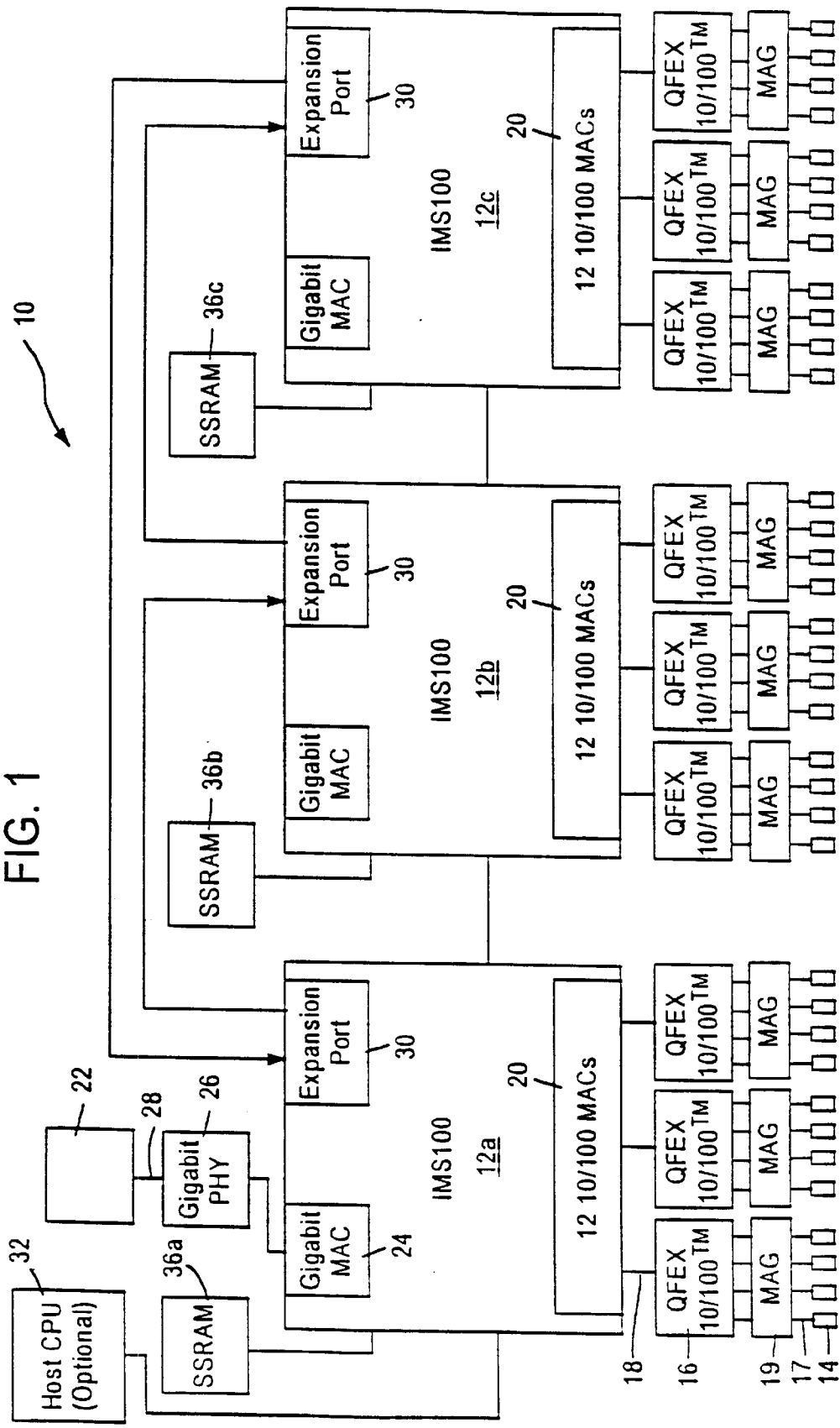
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 0802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 0802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
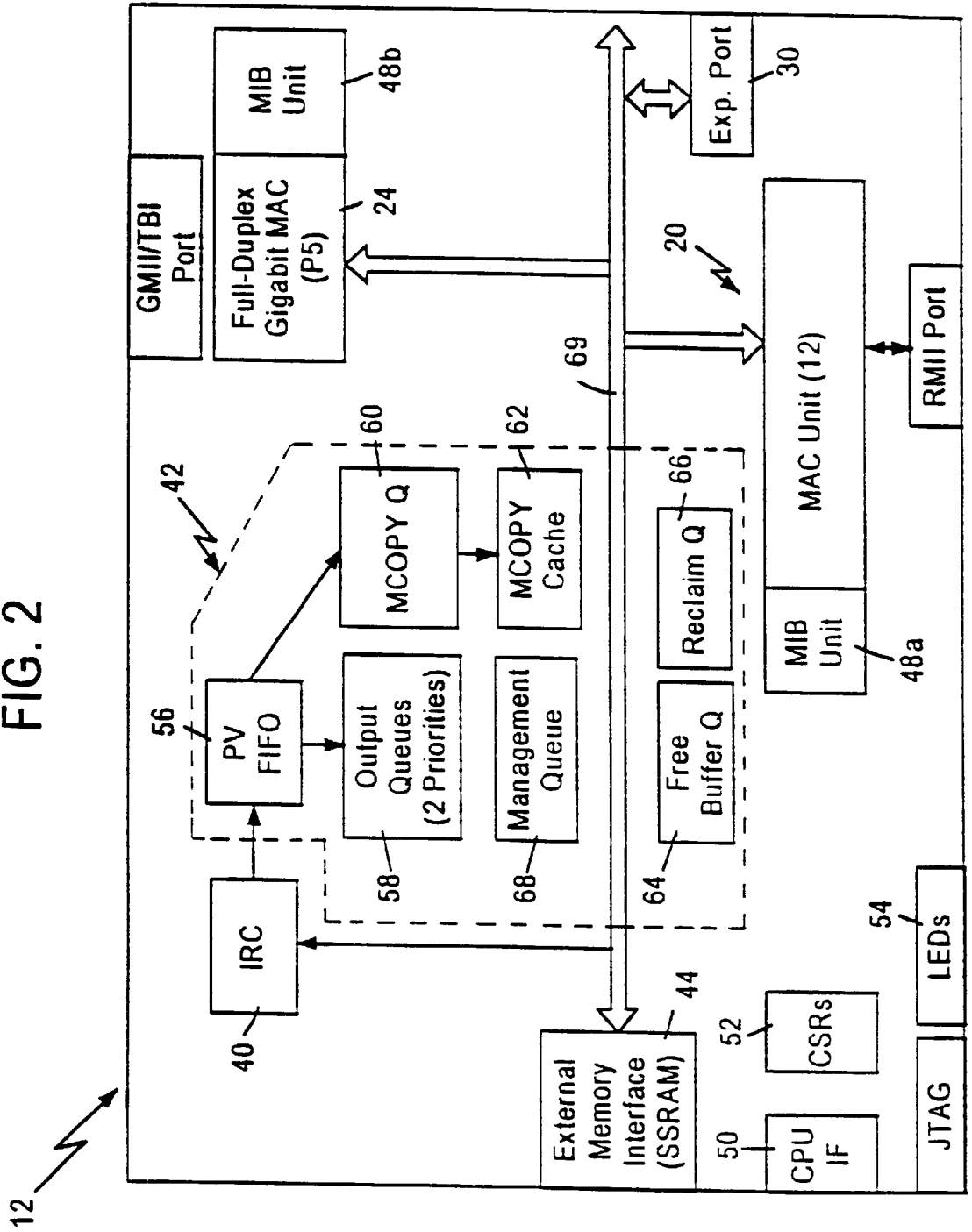
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 0802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128 K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
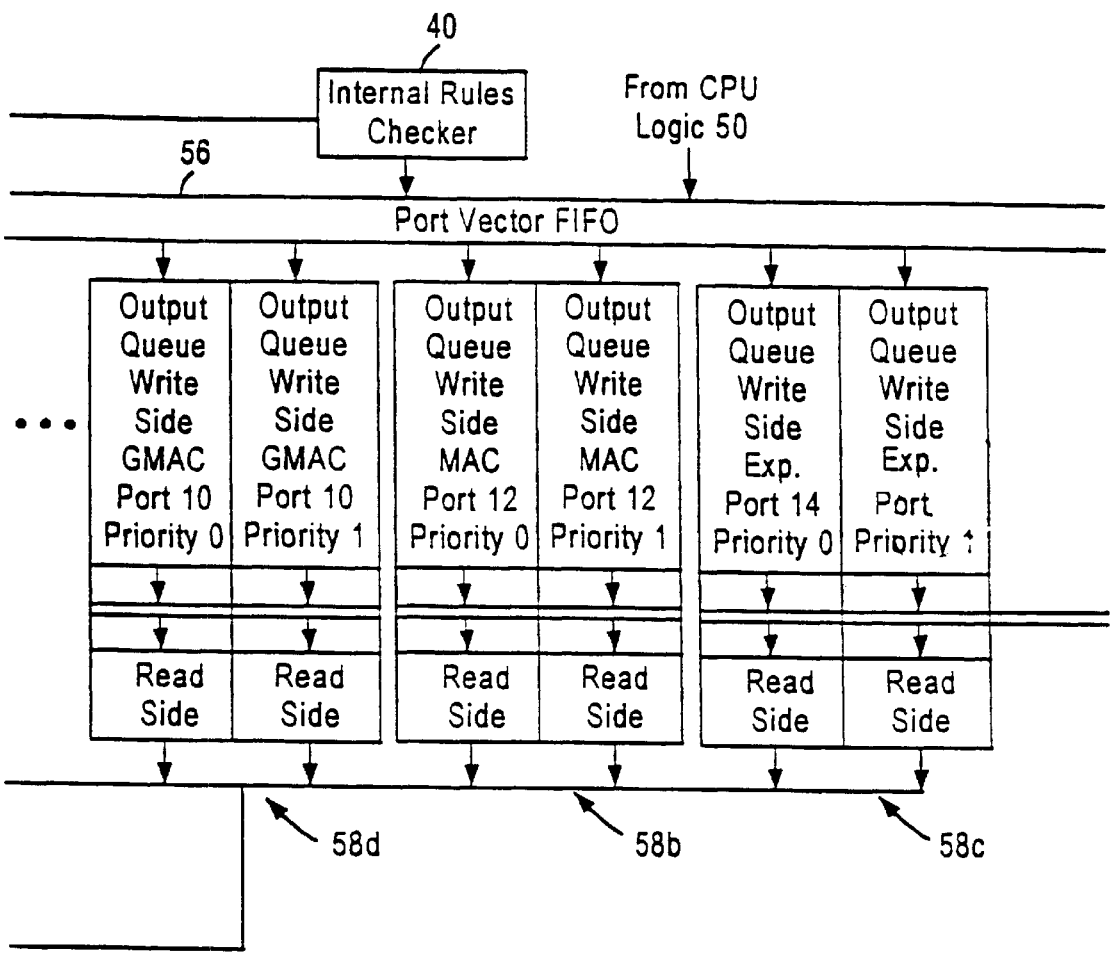
FIG. 3 comprised of FIGS. 3A–C is a block diagram illustrating in detail the switching subsystem of FIG. 2.
Figure 3C:
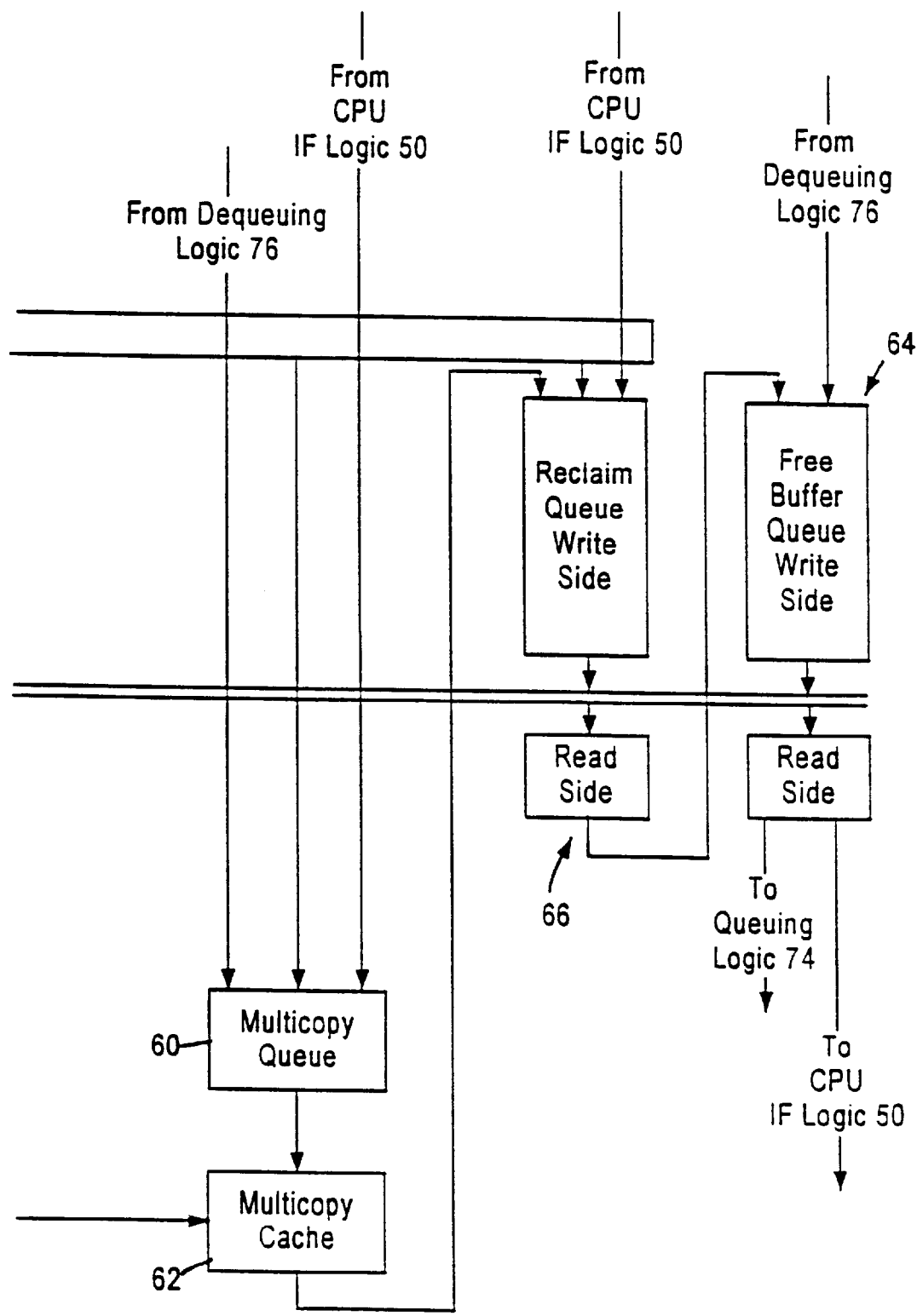

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft 802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access ()MA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the network switch 12 will now be provided.

Dynamic Allocation of Bandwidth

The scheduler 80, as part of the external memory interface 44, is used for scheduling and responding to requests for bandwidth from the ports and issuing grants of bandwidth to those requesting ports for access to the SSRAM 36. In this particular embodiment, the SSRAM 36 preferably has a 64-bit wide data path with a 100 Mb/s clock equaling a maximum 6.4 Gigabit throughput (minus a few cycles for read-write turnaround). The external memory interface 44 is configured to transfer packet data between the network switch 12 and the external SSRAM 36. The present implementation includes twelve (12) 10/100 Mb/s full-duplex ports plus a full-duplex Gigabit port 24 (i.e., 2 Gb/s). In addition, Expansion port 30 normally has a data rate of 1.2 Gb/s, but this rate may be increase dependent upon the throughput level required due to increased network traffic or the number of multiple network switches being cascaded via the Expansion port. For example, if three (3) network switches 12 are cascaded via the Expansion ports as shown in FIG. 1, the rate could increase by a multiple of three (i.e., 3.6 Gb/s). Thus, the bandwidth capacity for accesses to the SSRAM 36 (i.e., 6.4 Gb/s) may easily be exceeded due to network conditions or configurations. Hence, the scheduler 80 is called upon to allocate the limited memory bandwidth resources given the surpassed bandwidth.

In a present embodiment, each of the twelve (12) 10/100 Mb/s switch ports controlled by the MAC 20 is assigned a fixed grant of bandwidth slots by the scheduler 80. Hence, no request for bandwidth is necessary from the 10/100 ports to the external memory interface 44. The Gigabit port 24 and the Expansion port 30 share a combined bandwidth pool, the allocation of which is based upon requests from the Gigabit port 24. In the allocation of slots, the Gigabit port 24 is given higher priority for receiving slots from the bandwidth pool.

The bandwidth pool includes enough slots to accommodate the entire bandwidth capacity of the full-duplex Gigabit port 24 (i.e., 2 Gb/s) and further includes additional slots for the Expansion port 30. As an example, the bandwidth pool contains 2.3 Gb/s of bandwidth capacity. From this 2.3 Gb/s of bandwidth, the scheduler 80 initially designates 2 Gb/s of bandwidth slots as primary slots assigned to the Gigabit port 24. These primary slots are granted to the Gigabit port 24 by the scheduler 80 if the Gigabit port 24 requests the slots within a prescribed time interval. The scheduler 80 initially assigns the remaining 0.3 Gb/s (300 Mb/s) of bandwidth slots to the Expansion port 30.

If the scheduler 80 detects the absence of a slot request from the Gigabit port 24 in a prescribed time period, the scheduler will dynamically reallocate a primary slot initially assigned to the Gigabit port 24 and grant it to the Expansion port 30. This reallocation serves to prevent the waste of bandwidth slots not needed by the Gigabit port 24.

Figure 4:
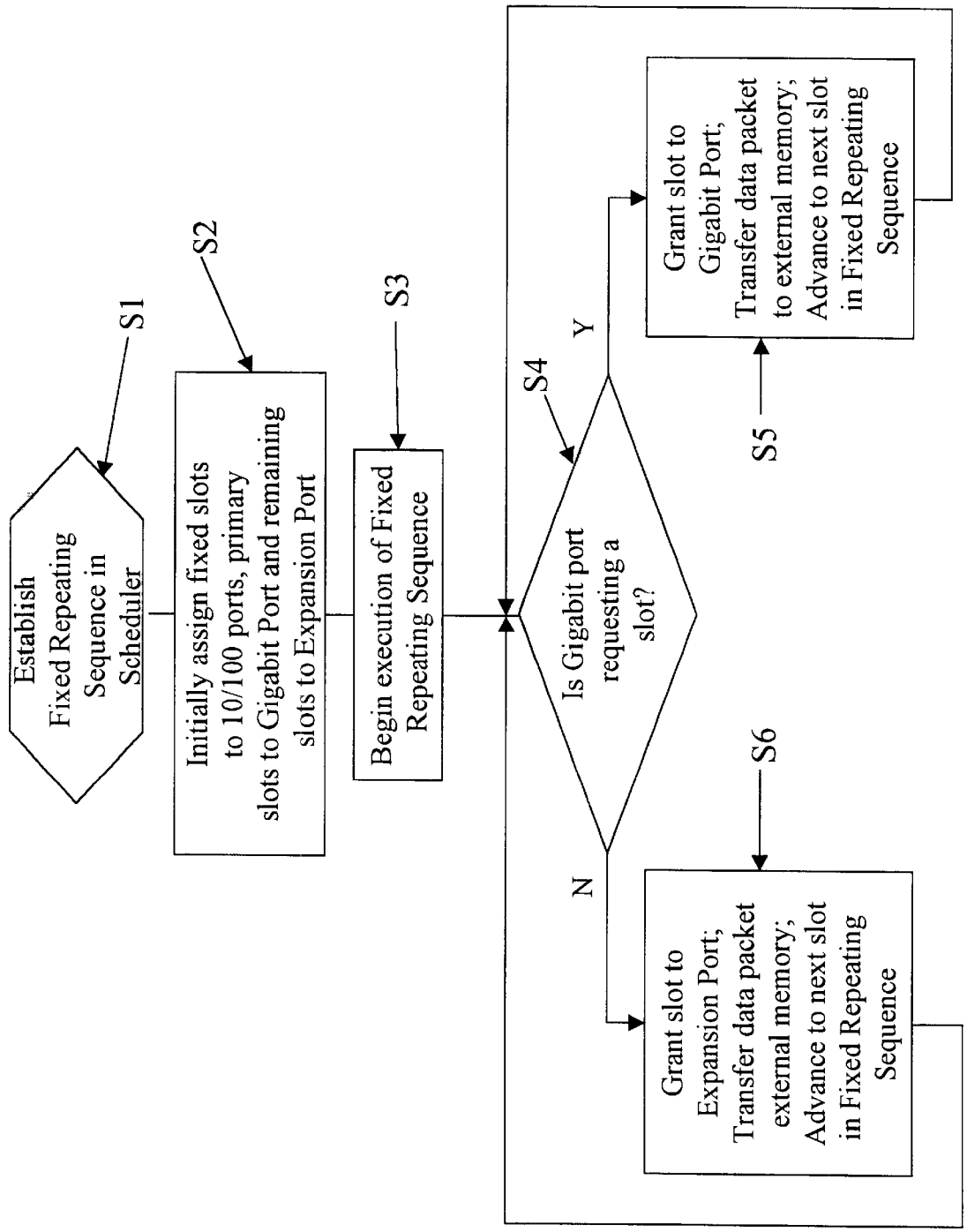
FIG. 4 is flow diagram illustrating a method according to an embodiment of the present invention.
Figure 5:
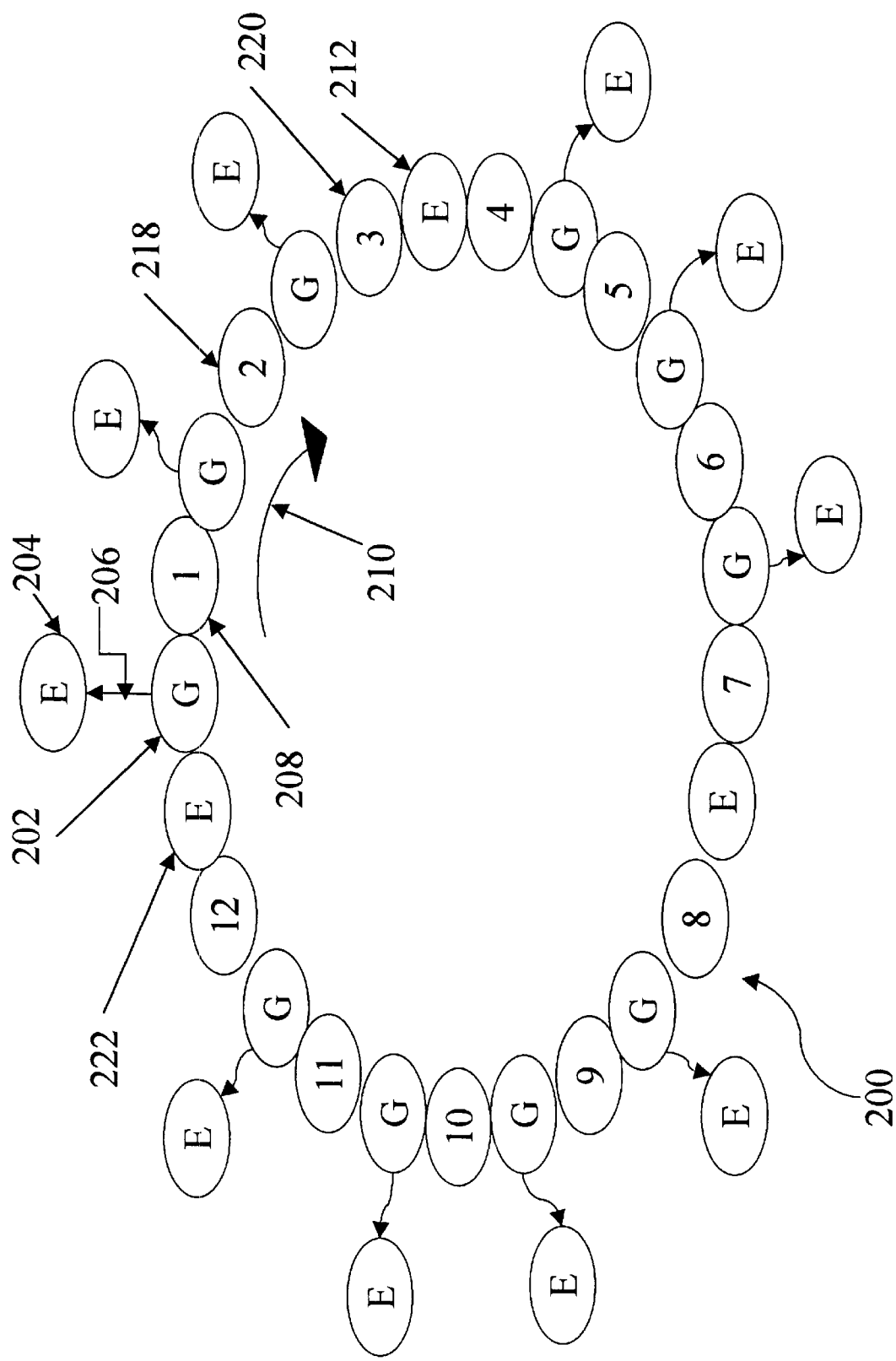
FIG. 5 is a sequence diagram according to an embodiment of the present invention.

FIG. 4 is a flow diagram illustrating the method by which memory slots are allocated by the scheduler 80 between the Gigabit port 24 and the Expansion port 30 according to an embodiment of the present invention. As indicated in step S1, the scheduler 80 establishes a prescribed repeating sequence of slots, such as the sequence 200 of slots in FIG. 5. FIG. 5 illustrates an exemplary repeating sequence 200 established by the scheduler 80 in assigning external memory access slots to the ports. The scheduler 80 establishes the sequence pattern:

G 1 G 2 G 3 E 4 G 5 G 6 G 7 E 8 G 9 G 10 G 11 G 12 E where G represents a slot assigned to the gigabit port 24, E represents a slot assigned to the Expansion port 30, and numerals 1–12 represent the assignment of slots to the respective 12-10/100 Mb/s ports within the MAC 12. Hence, the scheduler 80 assigns one slot to each of the 10/100 Mb/s ports, ten slots to the gigabit port 24 and three slots to the Expansion port 30 during a normal sequence cycle.

Hence, the scheduler 80 establishes the prescribed repeating sequence of slots by assigning a fixed number of slots to the 10/100 ports, (e.g., slots 1, 2, . . . 12) in step S1, initially establishing the assignment of the primary slots to the Gigabit port 24 (slot "G") and the remaining slots to the Expansion port 30 (slot "E") as indicated in step S2. The scheduler then selectively grants access to the SSRAM interface 78 according to the fixed repeating sequence 200 in step S3.

The sequence starts at a Gigabit port primary slot 202 in FIG. 5. The scheduler 80 determines in step S4 whether the Gigabit port 24 is requesting this slot within a prescribed period of time equal or less than the time of the slot. For example, the scheduler 80 determines whether a request is received at least on time slot 222 prior to the scheduled slot 202. If scheduler 80 detects a request from the Gigabit port 24 during slot 222, the scheduler 80 grants the slot 202 to the Gigabit port 24 in step S5. The scheduler 80 grants the next slot based on the fixed repeating sequence 200, and grants external memory access during fixed slot 208 to a 10/100 port (e.g., Port 1 in this embodiment). As indicated by arrow 210, the sequence order advances counter-clockwise in FIG. 5.

If the scheduler 80 determines in step S4 that the Gigabit port 24 has not requested the slot 202 within the prescribed period of time (e.g., by the end of slot 222), the scheduler 80 then dynamically reallocates the slot 202 to the Expansion port 30 in step S6 as indicated by an "E" in FIG. 5 and shown by reference number 204. The arrow 206 illustrates that the scheduler 80 reassigned the slot 202 to the Expansion port 30. The sequence is then advanced to the next slot (i.e., 208), where the scheduler grants memory access to a 10/100 port. As shown in FIG. 5, the sequence of the present embodiment interleaves slots allocated to the Gigabit ("G") and Expansion ("E") ports with the fixed slots assigned to the twelve 10/100 ports (i.e., numbers 1–12).

During both steps S5 and S6, the fixed sequence is advanced by scheduler 80 the process returns to step S4 where the scheduler determines whether the Gigabit port 24 is requesting the next slot in the sequence, and selectively assigns the "G" or "E" slots based on the detected presence of a grant signal.

Hence, the scheduler 80 grants memory access to respective 10/100 switch ports during the fixed slots (e.g., 210, 220, 230). Thus, the assignment of the first group of slots as fixed slots to the first ports serves to minimize the need for complex arbitration logic and affords the present invention easier and less costly implementation, while the dynamic assignment of slots between the higher data rate second and third ports serves to efficiently utilize a limited number of slots, allowing less costly memory resources to be utilized with the network switch.

Figure 6:
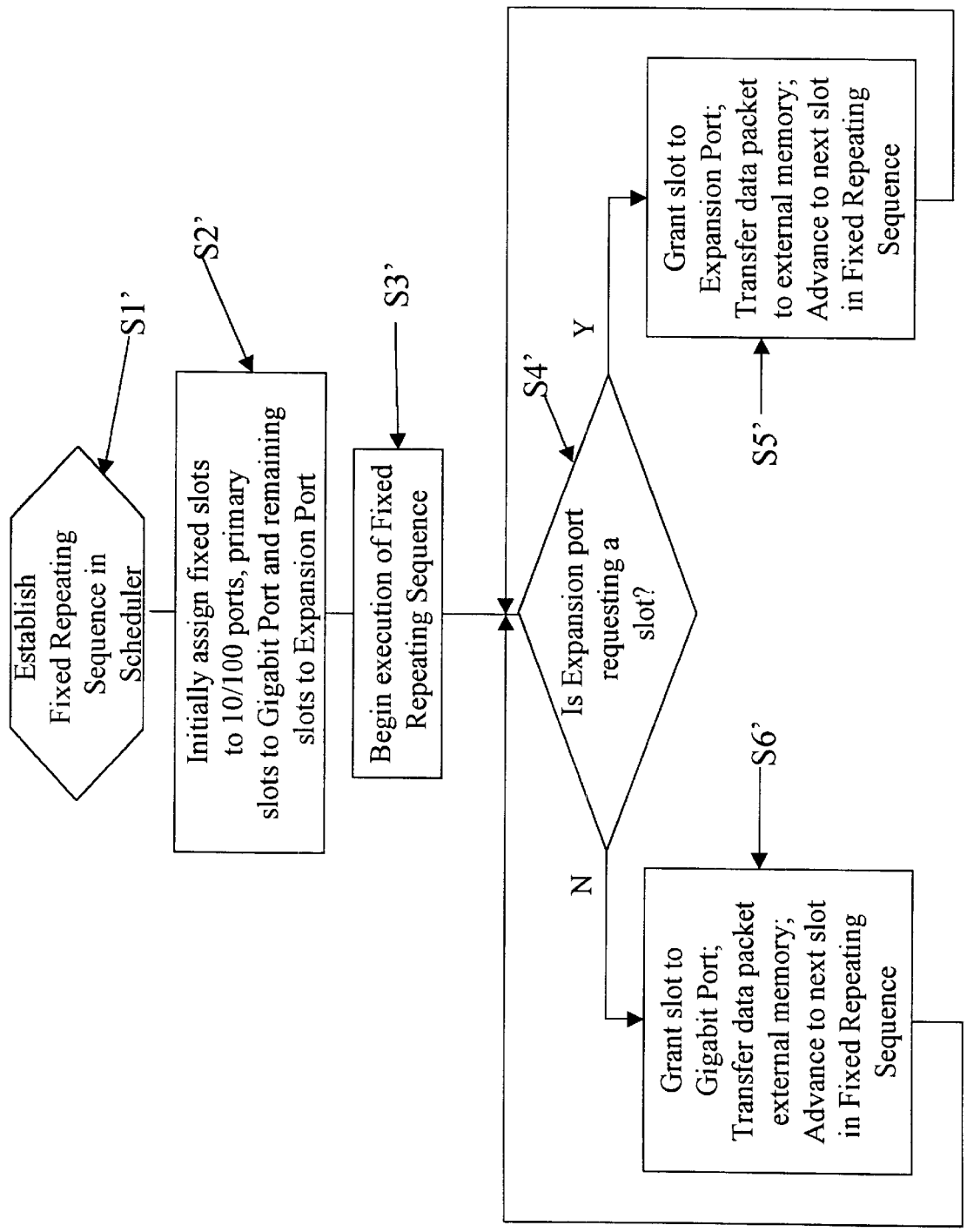
FIG. 6 is flow diagram illustrating a method according to another embodiment of the present invention.
Figure 7:
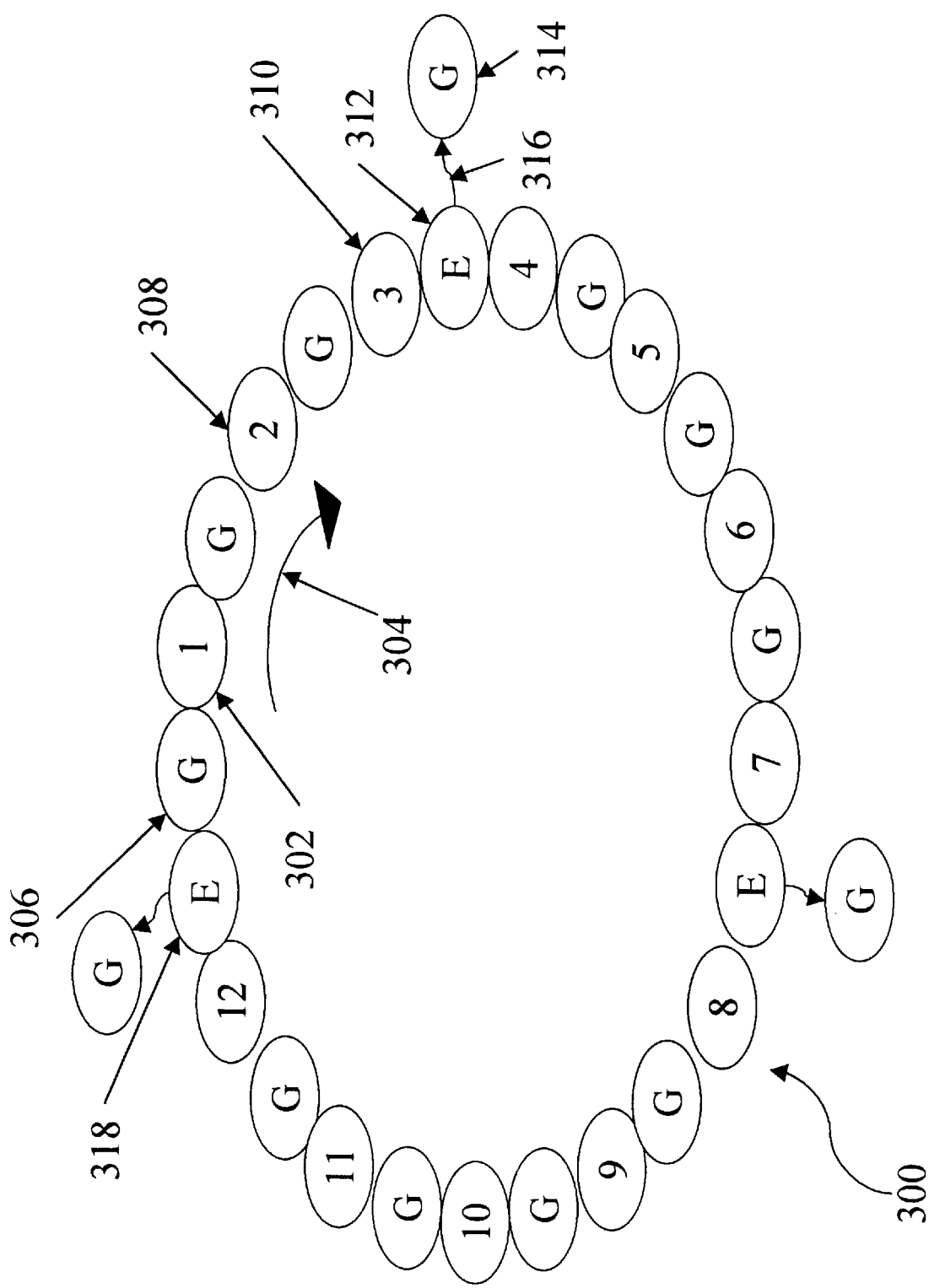
FIG. 7 is a sequence diagram according to another embodiment of the present invention.

According to another embodiment of the invention as shown in FIGS. 6 and 7, the initial sequence and assignment of slots is made at steps S1' and S2' (See FIG. 6) similar to the previously discussed embodiment and is illustrated by the sequence 300 in FIG. 7. However, in this embodiment, when the scheduler 80 determines at step S4' whether the Expansion port 30 is requesting a slot. Hence, when the sequence advances to a slot initially assigned to the Expansion port 30 (e.g., 312), the scheduler 80 is configured to determine whether the Expansion port 30 is issuing a slot request for the time slot 312. If the scheduler 80 determines at step S4' that the Expansion port 30 has requested the slot 312 within a prescribed period of time (e.g., by the end of previous slot 310), the scheduler 80 grants the slot 312 at step S5' to the Expansion port 30. Alternatively, if the scheduler 80 determines that the Expansion port 30 has not requested the slot 312 within the prescribed period of time, the scheduler 80 dynamically reassigns the slot at step S6' to the Gigabit port 24 as indicated by the "G" slot 314 and arrow 316.

Other embodiments could include assigning the primary slots to the Expansion port 30, rather than the Gigabit port 24. In addition, within these and other embodiments, bandwidth requests could be received from either the Gigabit port 24 or the Expansion port 30 or both.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the amended claims.

What is claimed is:

1. A network switch comprising:

one or more first ports configured for transferring packet data at a first data rare;

at least one second port configured for transferring packet data at a second data rate higher the first data rate;

at least one third port configured for transferring packet data at a third data rate higher than the first data rate; and an external memory interface configured for transferring packet data between the network switch and an external memory according to a prescribed bandwidth, the external memory interface having a scheduler that assigns slots for data transfer according to the prescribed bandwidth, the scheduler assigning a first group of slots as fixed slots for the first ports, respectively, and dynamically assigning a second selected group of slots between the at least one second port and the at least one third port based on a detected presence of a slot request received from at least one of the second and third ports, wherein the scheduler designates a fist portion of the second selected group of slots as primary slots initially assigned to the at least one second port and a remaining portion of the second selected group of slots as remaining slots assigned to the at least one third port, and in response to a determined absence of a slot request from the at least one second port during a prescribed time period, the scheduler reassigns a selected one of the primary slots assigned to the at least one second port to the at least one third port.

2. The network switch according to claim 1, wherein:

the at least one second port generates the slot request in response to reception of a data packet; and the scheduler, in response to the slot request from the at least one second port during the prescribed time period, causes transfer of the data packet to the external memory from the at least one second port during the selected one of the primary slots.

3. The network switch according to claim 2, wherein the scheduler, in response to the determined absence of the slot request during the prescribed time period and the reassignment of the selected one of tile primary slots assigned to the at least one second port to the at least one third port causes transfer of the data packet to the external memory from the at least one third port during the selected one of the prinmary slots.

4. The network switch according to claim 1, wherein:

the at least one third port generates a slot request in response to reception of a data packet; and the scheduler, in response to the slot request causes transfer of the data packet to the external memory from the at least one third port during a selected one of the remaining slots.

5. The network switch according to claim 1, wherein the scheduler assigns slots according to a prescribed repeating sequence.

6. The network switch according to claim 1, wherein the first ports each have a data rate of one of 10 Megabits per second and 100 Megabits per second.

7. The network switch according to claim 1, wherein the at least one second port has a data rate of 1 Gigabit per second.

8. The network switch according to claim 1, wherein the at least one third port has a data rate of about 1.2 Gigabits per second.

9. The network switch according to claim 1, wherein the at least one third port has a data rate dependent upon a throughput level determined by a current network switch condition.

10. A network switch comprising:

one or more first ports configured for transferring packet data at a first data rate;

at least one second port configured for transferring packet data al a second data rate higher than the first data rate;

at least one third port configured for transferring packet data at a third data rate higher than the first data rate; and an external memory interface configured for transferring packet data between the network switch and an external memory according to a prescribed bandwidth, the external memory interface assigning slots for data transfer according to the prescribed bandwidth, the external memory interface assigning a first group of slots as fixed slots for the ports, respectively, and dynamically assigning a second selected group of slots between the at least one second port and the at least one third port based on a detected presence of a slot request received from at least one of the second and third ports, wherein the external memory interface assigns a first portion of the second selected group of slots as primary slots initially assigned to the at least one second port and a remaining portion of the second selected group of slots as remaining slots assigned to the at least one third port, and in response to a determined absence of a slot request from the at least one second port during a prescribed time period, the external memory interface reassigns a selected one of the slots assigned to that least one second port to the at least one third port.

11. The network switch according to claim 10, wherein:

the at least one second port generates a slot request in response to reception of a data packet; and the external memory interface, in response to the slot request, causes transfer of the data packet to the external memory from the at least one second port during a selected one of the primary slots.

12. The network switch according to claim 10, wherein the external memory interface assigns slots according to a prescribed repeating sequence.

13. The network switch according to claim 10, wherein the first ports each have a data rate of one of 10 Megabits per second and 100 Megabits per second.

14. The network switch according to claim 10, wherein the second port has a data rate of 1 Gigabit per second.

15. The network switch according to claim 10, wherein the third port has a data rate of about 1.2 Gigabits per second.

16. The network switch according to claim 10, wherein the third port has a data rate dependent upon a throughput level determined by a current network switch condition.

17. A method of assigning bandwidth slots between ports of a network switch configured for transferring packet data to an external memory at a prescribed bandwidth, the method comprising the steps of:

assigning a predetermined number of bandwidth slots to a respective number of fist network switch ports configured for transferring packet data at a first data rate;

assigning a first portion of remaining bandwidth slots as primary slots initially assigned to at least one second switch port configured for transferring packet data at a second data rate higher than the first data rate;

assigning the remaining bandwidth slots as remaining slots assigned to at least one third port configured for transferring packet data at a third data rate higher than the first data rate;

determining whether the at least one second port has generated a bandwidth request to an external memory interface for one of the primary slots within a prescribed period of time; and reassigning tile primary slot to the at least one third port based on a determined absence of the bandwidth request within tie prescribed period of time.

18. The method according to claim 17, further comprising:

assigning the bandwidth slots among the network switch ports according to a prescribed repeating sequence.

19. The method according to claim 16, wherein the prescribed repeating sequence includes interleaving the predetermined number of slots with the remaining number of slots.

20. The method according to claim 17, wherein the network switch ports each have a data rate of one of 10 Megabits per second and 100 Megabits per second.

21. The method according to claim 17, wherein at least one of the higher rate switch ports has a data rate of 1 Gigabit per second.

22. The method according to claim 17, wherein at least one of the higher rate switch ports has a data rate of about 1.2 Gigabits per second.

23. The method according to claim 17, wherein at least one of the at least one second port and the at least one third port has a data rate dependent upon a throughput level determined by a current network switch condition.

* * * * *